United States Patent
Guner et al.

(10) Patent No.: US 10,782,438 B2
(45) Date of Patent: Sep. 22, 2020

(54) FORMATION DIP DETERMINATION USING RESISTIVITY IMAGING TOOL

(71) Applicant: Halliburton Energy Services, Inc., Houston, TX (US)

(72) Inventors: Baris Guner, Houston, TX (US); Burkay Donderici, Pittsford, NY (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/088,601

(22) PCT Filed: May 3, 2016

(86) PCT No.: PCT/US2016/030581
§ 371 (c)(1),
(2) Date: Sep. 26, 2018

(87) PCT Pub. No.: WO2017/192124
PCT Pub. Date: Nov. 9, 2017

(65) Prior Publication Data
US 2019/0113650 A1    Apr. 18, 2019

(51) Int. Cl.
*G01V 3/18* (2006.01)
*G01V 3/38* (2006.01)
*G01V 3/20* (2006.01)

(52) U.S. Cl.
CPC . *G01V 3/38* (2013.01); *G01V 3/20* (2013.01)

(58) Field of Classification Search
CPC combination set(s) only.
See application file for complete search history.

(56) References Cited

U.S. PATENT DOCUMENTS 6,594,584 B1 * 7/2003 Omeragic ............... G01V 3/28
                                                        702/9
2008/0281667 A1 * 11/2008 Chen .................... G01V 3/30
                                                        73/152.02
(Continued)

FOREIGN PATENT DOCUMENTS

WO      2013101691 A1      7/2013
WO      2015084390 A1      6/2015
WO      WO-2015134455 A1 * 9/2015 ............... G01V 3/38

OTHER PUBLICATIONS

PCT Application Serial No. PCT/US2016/030581, International Search Report, dated Feb. 1, 2017, 3 pages.
(Continued)

*Primary Examiner* — Jermele M Hollington
*Assistant Examiner* — Taqi R Nasir
(74) *Attorney, Agent, or Firm* — Gilliam IP PLLC

(57) ABSTRACT

Technology for obtaining formation parameters of a geological formation includes measuring a resistivity image of the geological formation. The measured resistivity image is compared to a modelled resistivity image where the modelled resistivity image is generated based on estimated formation parameters. A cost function is calculated based on the measure resistivity image and the modelled resistivity image. The estimated formation parameters are adjusted based on minimizing the cost function in order to generate a set of final formation parameters that represents a modelled resistivity image having a smallest cost function.

21 Claims, 10 Drawing Sheets

(56) References Cited

U.S. PATENT DOCUMENTS

| | | | | |
|---|---|---|---|---|
| 2009/0277686 A1* | 11/2009 | Hartmann | ............... | E21B 47/04 |
| | | | | 175/50 |
| 2010/0305863 A1* | 12/2010 | Abubakar | .............. | G01V 11/00 |
| | | | | 702/7 |
| 2014/0184229 A1* | 7/2014 | Bloemenkamp | ......... | G01V 3/20 |
| | | | | 324/369 |
| 2015/0008927 A1* | 1/2015 | Cheung | .................... | G01V 3/20 |
| | | | | 324/339 |

OTHER PUBLICATIONS

PCT Application Serial No. PCT/US2016/030581, International Written Opinion, dated Feb. 1, 2017, 10 pages.

* cited by examiner

FORMATION DIP DETERMINATION USING
RESISTIVITY IMAGING TOOL

BACKGROUND

Various techniques may be used to evaluate geological formations. For example, resistivity imaging tools operating on galvanic principles can provide resistivity logging for investigation of a geological formation immediately surrounding a borehole. These tools produce a resistivity image of the formation around the borehole to obtain information regarding features of the formation such as formation boundary dip (i.e., the angle between a planar feature, such as a sedimentary bed or a fracture, and a reference horizontal plane). The tools include button-shaped electrodes mounted on pads around the circumference of the tool axis.

As the resistivity imaging tool passes a boundary between different layers of the formation, a sinusoidal variation in the resistivity of the formation is observed. Thus, a sinusoidal fit method may be used to measure the dip of the formation. However, the sinusoidal fit method may not be accurate if the formation properties are different than the ones assumed in dip calculation. Additionally, since the sinusoidal fit method is typically performed manually, operational errors may be introduced into the results.

DETAILED DESCRIPTION

To address some of the challenges described above, as well as others, various examples of image spatial correlation and differencing methods may be used in retrieving formation parameters such as boundary dip angle, formation resistivities, and anisotropy ratio of the formation.

Figure 1:
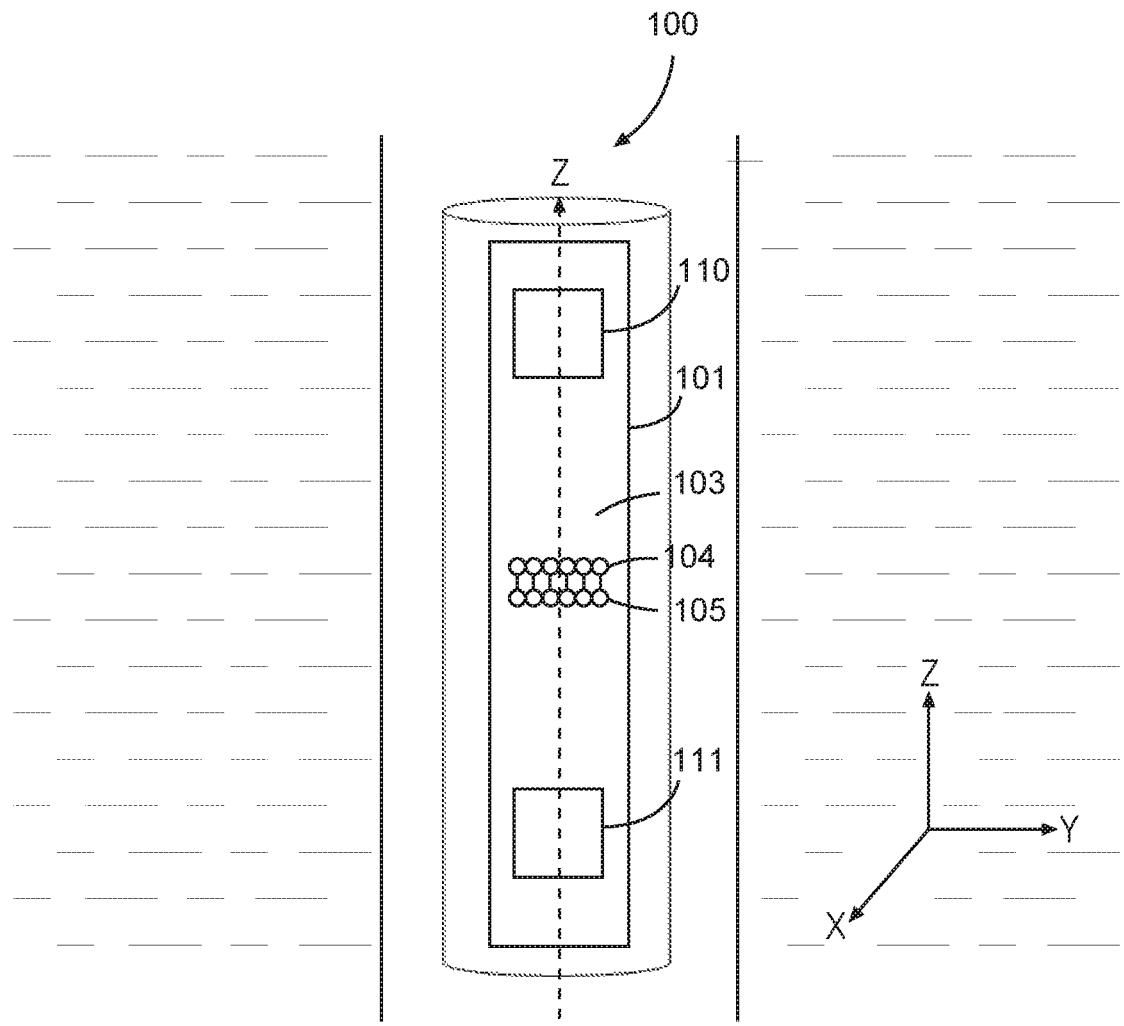
FIG. 1 is a diagram showing a resistivity imaging tool, according to various examples of the disclosure.

FIG. 1 is a diagram showing a resistivity imaging tool 100, according to various examples of the disclosure. The resistivity imaging tool 100 of FIG. 1 is for purposes of illustration only as other imaging tools may be used.

The tool 100 comprises a pad 101 that may be placed in contact with the borehole wall. A top current electrode 110 and a bottom current electrode 111 are disposed on the pad 101. One of the electrodes (e.g., 110) may be referred to as a survey electrode that transmits current into a formation. The other electrode (e.g., 111) may be denoted as a return electrode that receives the current returned from the formation. Other examples may reverse this assignment of functions.

Circular "button" electrodes 103 may be disposed on the pad 101 substantially midway between the electrodes 110, 111. In an example, the button electrodes 103 are divided into top button electrodes 104 and bottom button electrodes 105. The multiple button electrode pairs are used to achieve greater azimuthal coverage.

The button electrodes 103 are used to measure the voltage drop as the current that is transmitted from the survey electrode 110 returns to the return electrode 111. Voltage differences between top button electrodes 104 and bottom button electrodes 105 are thus indicative of the formation resistivity.

For purposes of clarity, only a single pad 101 is shown. This pad 101 may cover a predetermined azimuth angle (e.g., 30°) around the tool 100. In another example, the tool 100 may include a plurality of pads 101 to increase the azimuthal coverage of the tool 100. For example, the imaging tool 100 may include enough pads 101 to cover 360° in azimuth around the tool 100.

Figure 2:
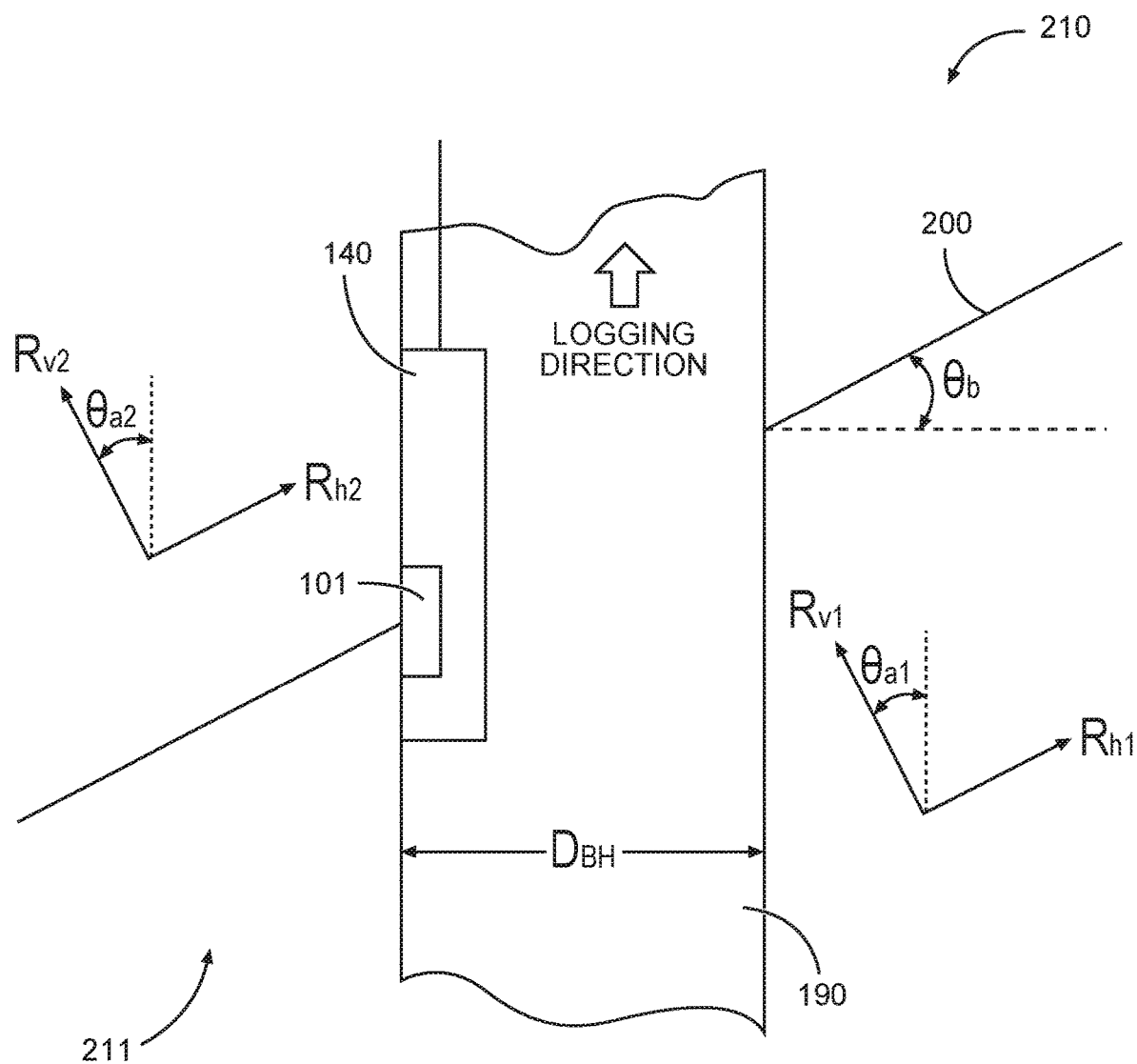
FIG. 2 is a cross-sectional diagram showing an imaging tool in a borehole of a formation with multiple resistivity regions, according to various examples of the disclosure.

FIG. 2 is a cross-sectional diagram showing an imaging tool 140 in a borehole of a formation with multiple resistivity regions 210, 211, according to various examples of the disclosure. The imaging tool 140 may include two or more electrode structures or pads 101 as discussed previously.

For simplicity, it is assumed that the formation includes only two different resistivity regions 210, 211 (i.e., formation layers). The examples included herein may be extended to multiple formation layers.

The resistivity regions 210, 211 are separated by a boundary 200. Shape of the boundary 200 is typically very similar to a plane local to the borehole position. As a result, a planar model is typically employed for the boundary 200. The existing interpretation methods are based on this assumption. However, in the method described below, curved shapes may also be used. The angle of this boundary relative to a horizontal reference is referred to as the dip angle and is denoted as $\theta_b$. There may be an azimuthal offset of the dip angle with respect to a reference point on the imaging tool 140 (e.g., one button electrode). The azimuthal offset angle may be referred to as a strike angle and represented by $\phi_b$. The diameter of the borehole 190 is denoted as $D_{BH}$ and the resistivity of the mud in the borehole is denoted as $R_m$. These formation parameters may generally be measured accurately without inversion so they are assumed to be known values.

The resistivity of the first region 210 is represented by horizontal resistivity $R_{h1}$ and vertical resistivity $R_{v1}$. The resistivity of the second region 211 is represented by horizontal resistivity $R_{h2}$ and vertical resistivity $R_{v2}$. The anisotropy dip angle for the first region 210 is then represented by $\theta_{a1}$ while the anisotropy dip angle for the second region 211 is represented by $\theta_{a2}$.

Azimuth angles for anisotropy may also be defined with respect to a reference point on the tool. For example, an azimuth angle of the first region may be represented by $\phi_{a1}$ and the second region by $\phi_{a2}$.

Figure 3:
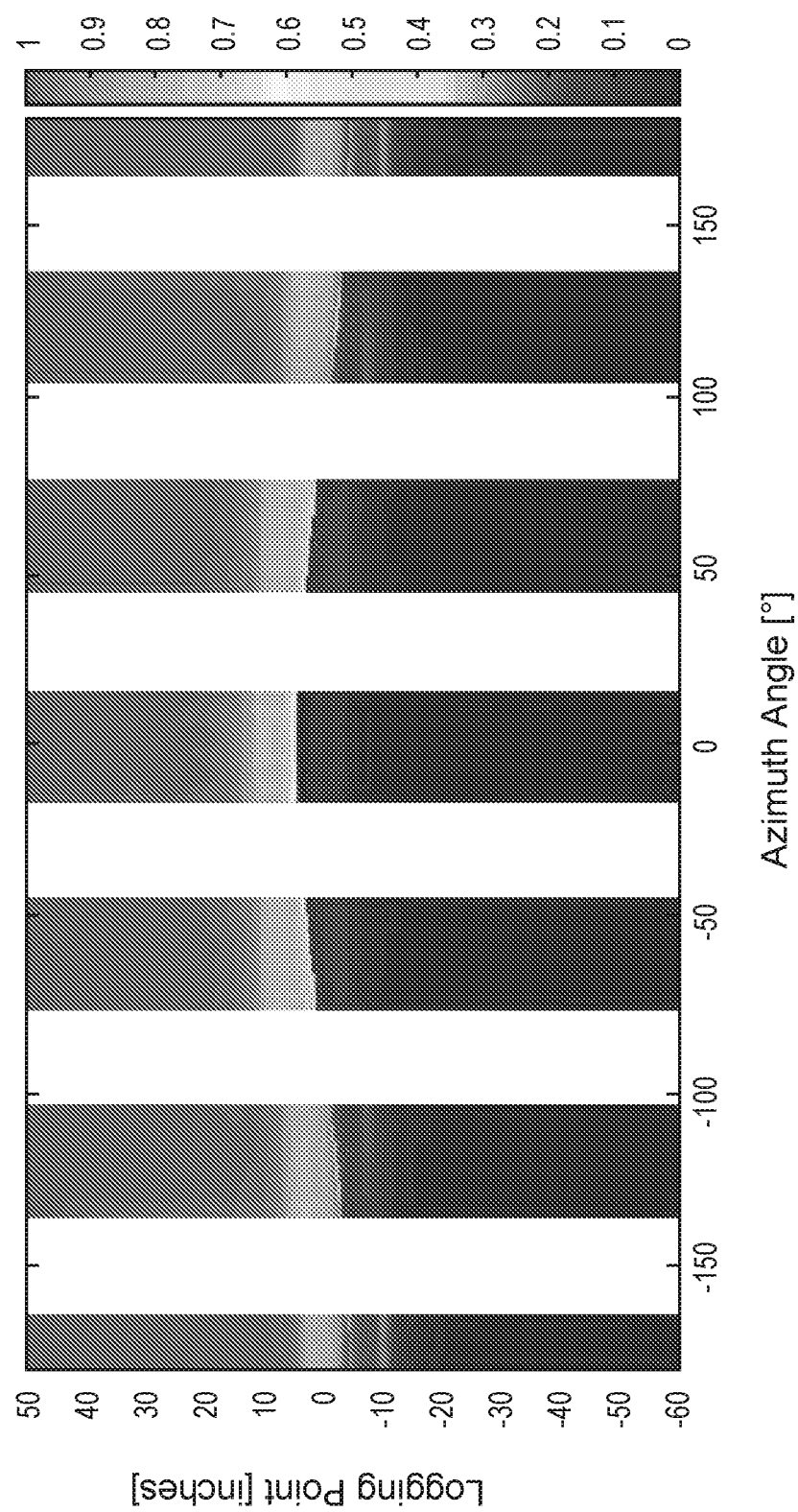
FIG. 3 is a resistivity image of a transition between two formation layers, according to various examples of the disclosure.

FIG. 3 is a resistivity image of a transition between two formation layers, according to various examples of the disclosure. For purposes of illustration, it is assumed that the borehole 190 through the two resistivity regions 210, 211 of FIG. 2 is being imaged and shown in FIG. 3. Also for purposes of illustration only, it is assumed that $R_{h1}=R_{v1}=1$ Ohm-meter (Ω-m) and $R_{h2}=R_{v2}=10$ Ω-m. The borehole diameter is assumed to be 8.5 inches and the boundary dip angle $\theta_b$ is 45°. The strike angle is assumed to be 0°.

The resistivity image is a measured apparent resistivity on a logarithmic scale of base 10 as a function of logging position and azimuth angle along the borehole. The "0" of the Logging Position scale is assumed to be the intersection of the boundary 200 with the center of the borehole 190 while the azimuth angle is the rotational angle of the tool from a "0" reference point.

Figure 4:
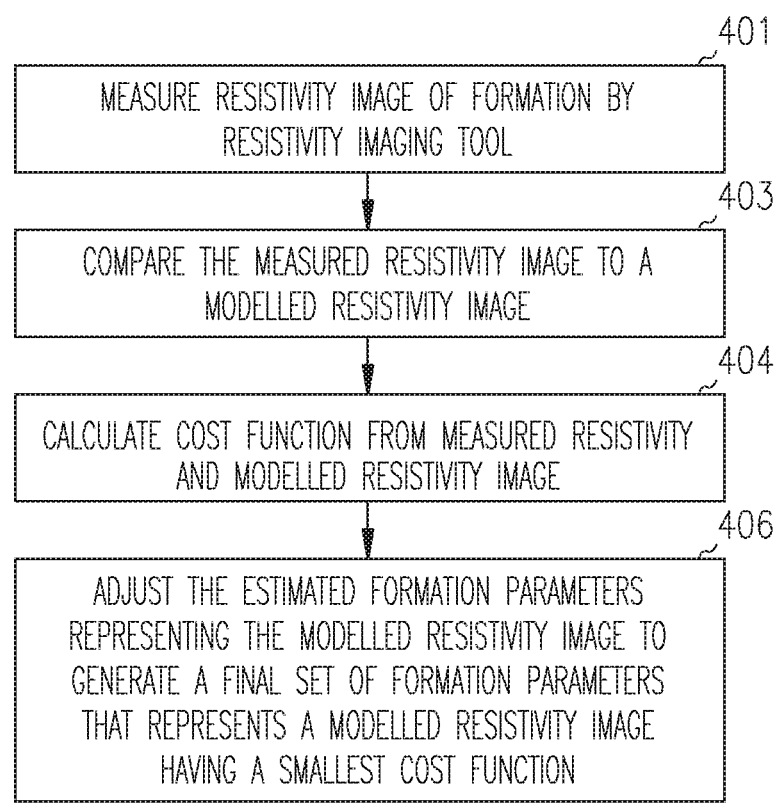
FIG. 4 is a flowchart of a method for parameter retrieval from resistivity imaging tools, according to various examples of the disclosure.

FIG. 4 is a flowchart of a method for parameter retrieval from resistivity imaging tools, according to various examples of the disclosure. This method selects a resistivity parameter model having the closest representation of the measured image and may be implemented in various ways, as illustrated by the example methods of FIGS. 5 and 6 (i.e., spatial correlation and differencing).

The subsequently described methods use the following resistivity imaging tool formation parameters: resistivity of the formation layers ($R_{h1}$, $R_{v1}$, $R_{h2}$, $R_{v2}$), layer boundary depth in borehole z (as measured from the surface), layer boundary dip angle $\theta_b$, anisotropy information including anisotropy dip angle of each formation layer (e.g., $\theta_{a1}$, $\theta_{a2}$) and anisotropy azimuth angles of each layer (e.g., $\phi_{a1}$, $\phi_{a2}$) and/or the strike angle $\phi_b$. These parameters are for purposes of illustration as other examples may use more than these parameters or a subset of these parameters.

In block 401, the method begins with the measurement of the resistivity image of the formation by a resistivity imaging tool. The resistivity image may be measured by the apparatus illustrated in FIG. 1 in combination with a controller (as illustrated in the system diagrams of FIGS. 8-10) or by some other imaging tool system.

In block 403, the measured resistivity image is compared to a modelled resistivity image. Where the modelled resistivity image is obtained from estimated formation parameters through electromagnetic modeling. 1-dimensional, 2-dimensional or 3-dimensional forward models based on finite difference, finite element, integral equations, method of moments, semi-analytical or any other electromagnetic solvers may be used. Here N-dimensional refers to modeling the environment where material properties in the environment are allowed to change only in N dimensions in a given coordinate system (Cartesian, Cylindrical, Spherical, etc.). The estimated formation parameters comprise anisotropic information, formation layer transition length, horizontal resistivity, vertical resistivity, strike angle, a transition length between adjacent layers, and/or formation boundary layer dip angle in the modelled resistivity image. The modelled resistivity image may represent a formation comprising a plurality of formation layers and further comprise a borehole azimuthal coverage, a borehole depth coverage, and a number of image pixels based on the estimated formation parameters.

Figure 7:
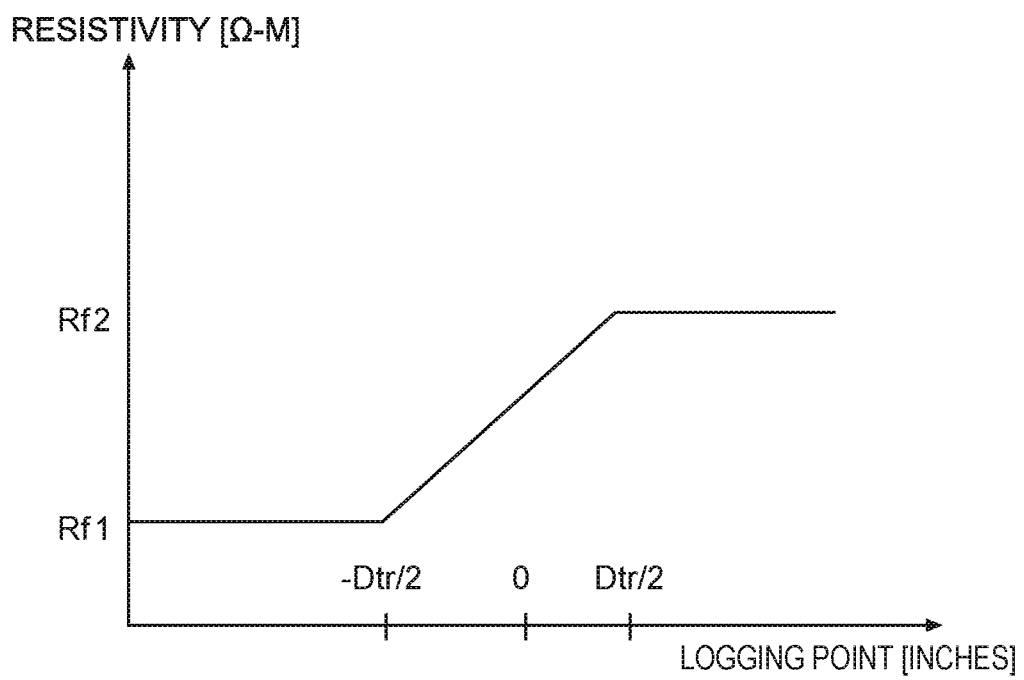
FIG. 7 is a plot of a resistivity profile illustrating formation layer transition length, according to aspects of the present disclosure.

FIG. 7 is a plot of a resistivity profile illustrating formation layer transition length, according to aspects of the present disclosure. The plot includes the logging points, in inches, along the x-axis and the geological formation resistivity, in Ohm-meters along the y-axis.

This plot shows the concept of a change in resistivity at a formation layer boundary. The illustrated plot shows a change in resistivity from $R_{f1}$ to $R_{f2}$ over a distance between −Dtr/2 to Dtr/2. While this plot illustrates a gradual, linear transition length, other examples may have more abrupt or non-linear transitions of resistivity.

Referring again to FIG. 4, in block 404, a cost function is calculated from the measured resistivity and the modelled resistivity image. As described subsequently, the cost function comprises a spatial correlation operation or a subtraction between the measured resistivity image and a plurality of the estimated formation parameters.

In block 406, the estimated formation parameters representing the modelled resistivity image are adjusted to generate final formation parameters that represent a modelled resistivity image having a smallest cost function. The estimated formation parameters may be adjusted by replacing a set of predetermined formation parameters with one of a plurality of sets of predetermined formation parameters to determine a final set of formation parameters, wherein the final set of formation parameters represents a modelled resistivity image having a smallest difference with the measured resistivity image relative to the modelled resistivity images represented by other sets of predetermined formation parameters. The estimated formation parameters may also be adjusted by performing an inversion process based on the cost function or performing a database search operation based on pre-computed modelled resistivity images.

The method may further comprise comprising logging isotropic resistivity, anisotropic resistivity, and boundary layer dip angle of the geological formation in response to concatenating resistivity image measurements from a plurality of resistivity image measurements at different depths.

Figure 5:
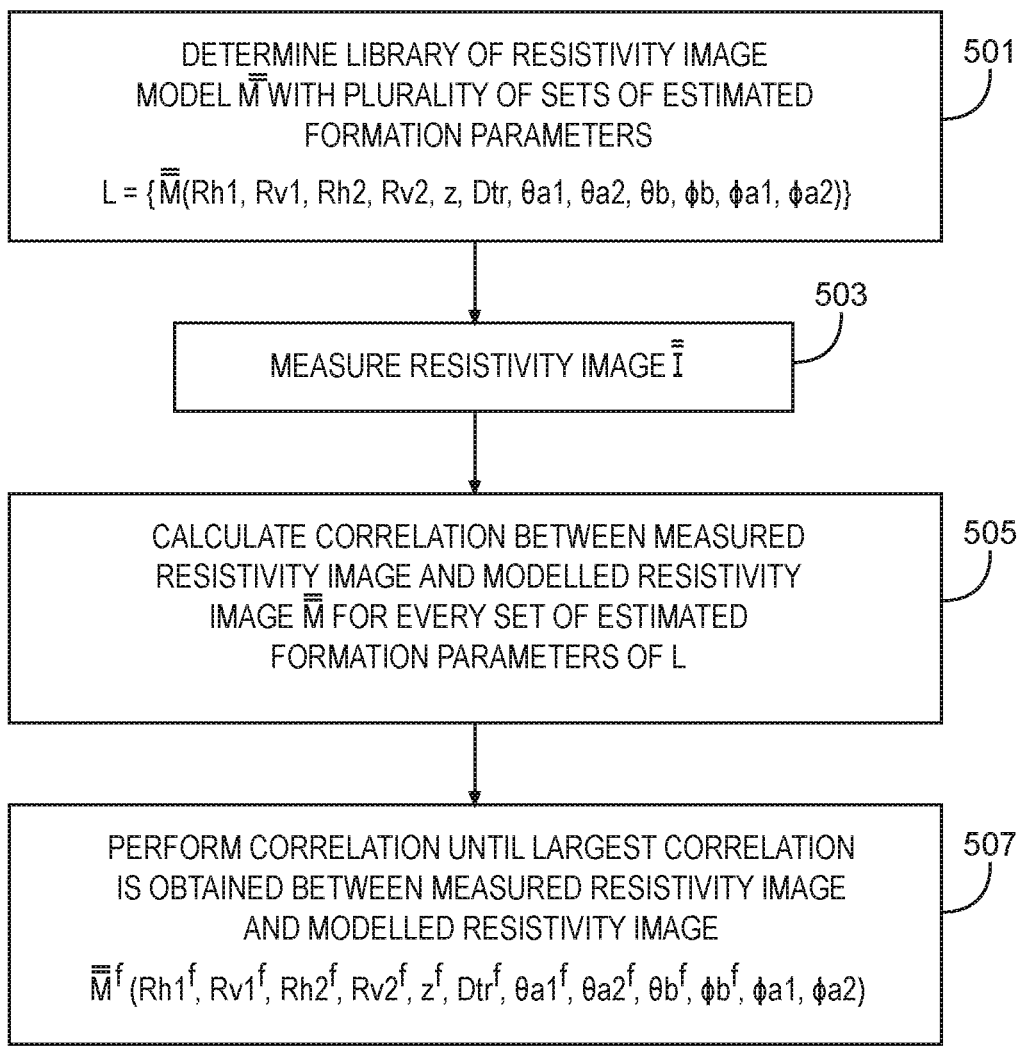
FIG. 5 is a flowchart of a method for parameter retrieval from resistivity imaging tools using a spatial correlation technique, according to various examples of the disclosure.

FIG. 5 is a flowchart of a method for parameter retrieval from resistivity imaging tools using a spatial correlation technique, according to various examples of the disclosure. In an example, the spatial correlation technique may use formation resistivity data from an imaging tool using button electrodes as illustrated in FIG. 1. Other examples may use other imaging tools to measure the resistivity data.

Spatial correlation is measure of the dependence of two variable. The spatial correlation of the two images is defined as:

$$\text{corr} = \frac{\sum_{i,j}\left(\left(X(i,j) - \frac{1}{N}\sum_{i,j}X(i,j)\right)\left(Y(i,j) - \frac{1}{N}\sum_{i,j}Y(i,j)\right)\right)}{\sqrt{\sum_{i,j}\left(\left(X(i,j) - \frac{1}{N}\sum_{i,j}X(i,j)\right)^2\right)\sum_{i,j}\left(\left(Y(i,j) - \frac{1}{N}\sum_{i,j}Y(i,j)\right)^2\right)}}$$

where X and Y are the first and the second images, M denotes the mean along all dimensions, i denotes the azimuthal index of the respective image, j denotes the depth index of the respective image and N denotes the number of i, j combinations in the sum.

If X and Y are highly similar, the value of their spatial correlation increases. A maximum spatial correlation value of 1 is obtained when X has a linear dependence to Y (which is a similarity condition). If X and Y are orthogonal vectors (which is a dissimilarity condition), the spatial correlation becomes zero.

In the method for parameter retrieval from resistivity imaging tools using the spatial correlation technique, a forward model of the geological formation is used to simulate the resistivity image that would be obtained by the tool for a given set of formation parameters. This forward model may be denoted by $\overline{M}$. The resistivity transition length (Dtr)

may also be input to the method if a linear transition occurs between the different resistivity regions of the layers is assumed.

In block 501, a library L of a resistivity image model $\overline{M}$ comprising different sets of estimated formation parameters is determined. The sets of parameters in FIG. 5 are for two geological formation layers. An example set of parameters was discussed previously. The model produces a modelled resistivity image of a certain size (e.g., azimuth coverage, depth coverage, and number of pixels) corresponding to the given set of estimated formation parameters.

The estimated formation parameters of FIG. 5 are for purposes of illustration only. The quantity and type of formation parameters, as well as the number of formation layers represented, may be different for other examples.

In block 503, the resistivity imaging tool measures a resistivity image in the borehole. Such an image is denoted by $\overline{I}$.

In block 505, a spatial correlation is calculated between the measured resistivity image and the modelled resistivity image that has been updated for every set of estimated formation parameters of the library. In block 507, the spatial correlation is performed until the largest spatial correlation is obtained between the measured resistivity image and the modelled resistivity image comprising. The element $\overline{M}$ that maximizes the spatial correlation may be represented by a set of estimated formation parameters referred to as the final formation parameter set $\overline{M}^f(R_{h1}{}^f, R_{v1}{}^f, R_{h2}{}^f, R_{v2}{}^f, z^f, Dtr^f, \theta_{a1}{}^f, \theta_{a2}{}^f, \theta_b{}^f, \phi_b{}^f, \phi_{a1}{}^f, \phi_{a2}{}^f)$.

To obtain the final formation parameter set that maximizes the spatial correlation, a sweep of possible parameter ranges may be performed. In this search method, simulations for the desired sets of estimated formation parameters may be performed beforehand and stored in a library in memory. Alternate methods may use an iterative inversion technique that minimizes a cost function comprising an inverse of the magnitude of the spatial correlation.

Figure 6:
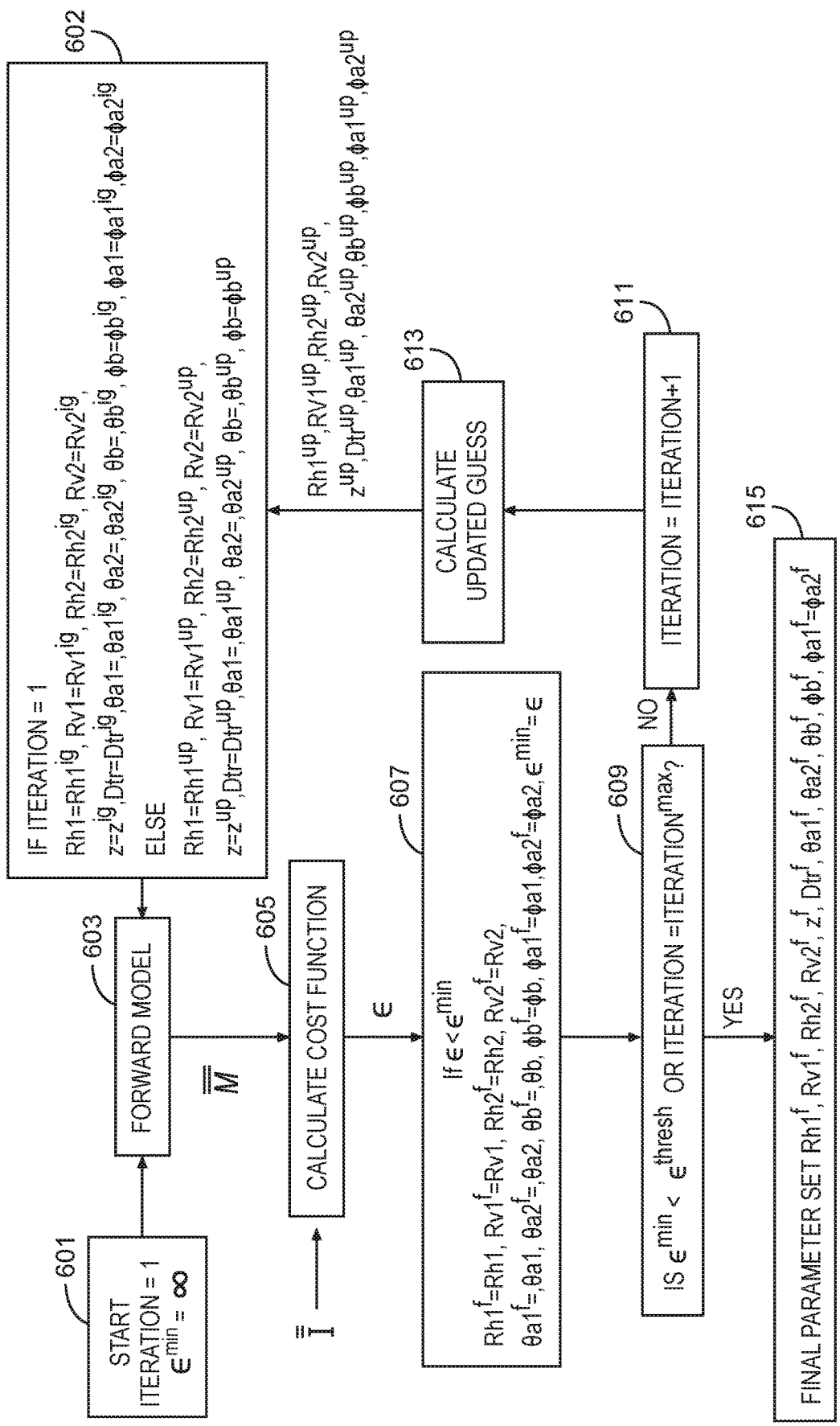
FIG. 6 is a flowchart of a method for parameter retrieval from resistivity imaging tools using a differencing method, according to various examples of the disclosure.

FIG. 6 is a flowchart of a method for parameter retrieval from resistivity imaging tools using a differencing method, according to various examples of the disclosure. In an example, the iterative inversion technique may use formation resistivity data from an imaging tool using button electrodes as illustrated in FIG. 1. Other examples may use other imaging tools to measure the resistivity data.

The differencing method is similar to the spatial correlation method of FIG. 5. In the differencing method, the cost function may include the error between the modelled resistivity image and the measured resistivity image. The minimization problem may be illustrated by $\min|\overline{I}-\overline{M}|^2$.

In both spatial correlation and differencing methods, inversion may search a predetermined range of estimated formation parameters to find the set that minimizes the cost function (e.g., the smallest cost function). The cost function may also include regularization terms to obtain a smoother variation in inversion results with respect to depth as an example. In FIG. 6, an inversion using an iterative search method, such as the Levenberg-Marquardt algorithm, is depicted. The search may also be done using a brute-force search method. In such a brute-force search, the model results may be precomputed and saved in a library to save computation time.

Note that the accuracy of the inversion result is dependent on the accuracy of the forward model. As mentioned before, the model of the formation used in the inversion may be changed to best fit the environment that is being imaged. Anisotropy or the presence of a gradual change in resistivity between formations may be incorporated in the forward model.

In the inversion, the measured resistivity image $\overline{I}$ is given as an input. An initial guess for the formation parameters is modeled, and the cost function ε between the model of the initial guess and the input is compared. Parameters of the model may again be $(R_{h1}, R_{v1}, R_{h2}, R_{v2}, z, Dtr, \theta_{a1}, \theta_{a2}, \phi_b, \phi_{a1}, \phi_{a2})$. Although not depicted in FIG. 6, some initial processing may be done prior to inversion. For example, prior art technique can be used as an initial guess for $\theta_b$ in this inversion. Similarly, $(R_h, R_v, \theta_a)$ values can be inverted separately for each formation layer previously using just the image pixels away from the boundary to simplify inversion. The boundary location (z) and image pixels away from the boundary corresponding to a formation layer may be determined by comparing the apparent resistivities; a change greater than a certain threshold may indicate the boundary.

In block 601, the iteration number is set to 1 and $\varepsilon^{min}$ set to infinity. In block 603 and 602, the forward model is determined by a set of estimated formation parameters. In block 605, the cost function is calculated using the measured image. In block 607, when the cost function is initially determined, it is set as the minimum cost function $\varepsilon^{min}$ (e.g., smallest cost function) in the first iteration step. In block 609, if the $\varepsilon^{min}$ is less than a specified threshold $\varepsilon^{thresh}$ (or the ITERATION count has reached the maximum iteration count ITERATION$^{MAX}$), the parameter set corresponding to initial guess may be returned as the final parameter set in block 615. Otherwise, the iteration number is increased by one in block 611, the guess for the model parameters are updated in block 613, and the cost function E for this new model is calculated in blocks 602, 603, 605. Again, the cost function is compared with $\varepsilon^{min}$ and if the new cost function is smaller than $\varepsilon^{min}$, this parameter set is stored as the set that returned the minimum cost function so far. These steps are repeated until the check for convergence is successful or the iteration number is equal to the maximum number of iterations ITERATION$^{max}$. At the end of the iterations, the parameter set that returned the minimum cost function is the final parameter set.

Figure 8:
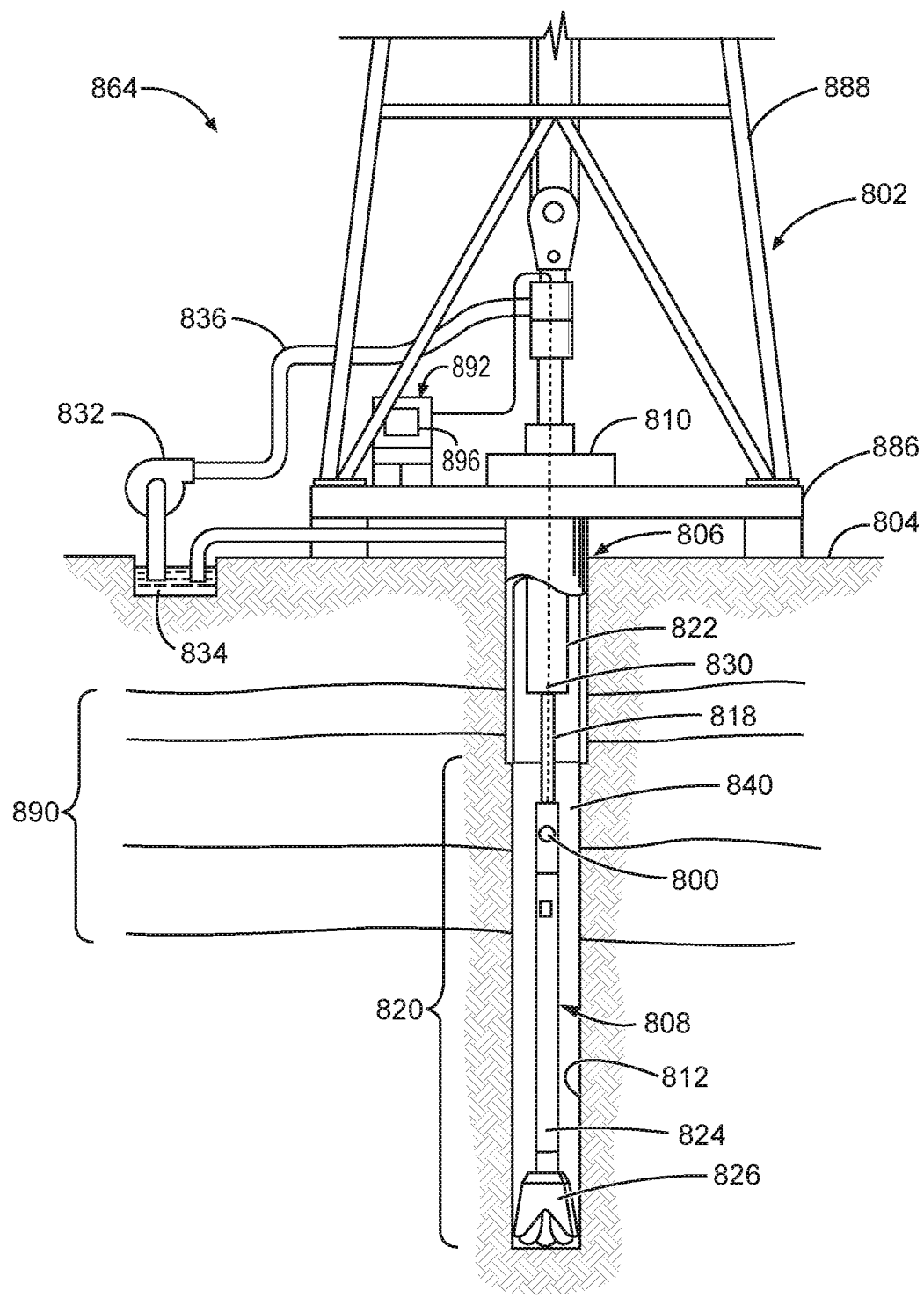
FIG. 8 is a diagram of a drilling system, according to aspects of the present disclosure.

FIG. 8 is a diagram showing a drilling system, according to various embodiments. The system 864 includes a drilling rig 802 located at the surface 804 of a well 806. The drilling rig 802 may provide support for a drillstring 808. The drillstring 808 may operate to penetrate the rotary table 810 for drilling the borehole 812 through the subsurface formations 890. The drillstring 808 may include a drill pipe 818 and the bottom hole assembly (BHA) 820 (e.g., drill string), perhaps located at the lower portion of the drill pipe 818.

The BHA 820 may include drill collars 822, a downhole tool 824, stabilizers, sensors, an RSS, a drill bit 826, as well as other possible components. The drill bit 826 may operate to create the borehole 812 by penetrating the surface 804 and the subsurface formations 890. The BHA 820 may further include a downhole tool including the resistivity imaging tool 800 as described previously in FIG. 1. The resistivity imaging tool 800 in combination with subsequently described controllers may form a resistivity imaging tool system.

During drilling operations within the borehole 812, the drillstring 808 (perhaps including the drill pipe 818 and the BHA 820) may be rotated by the rotary table 810. Although not shown, in addition to or alternatively, the BHA 820 may also be rotated by a motor (e.g., a mud motor) that is located downhole. The drill collars 822 may be used to add weight to the drill bit 826. The drill collars 822 may also operate to stiffen the BHA 820, allowing the BHA 820 to transfer the added weight to the drill bit 826, and in turn, to assist the drill bit 826 in penetrating the surface 804 and subsurface formations 890.

During drilling operations, a mud pump 832 may pump drilling fluid (sometimes known by those of ordinary skill in the art as "drilling mud") from a mud pit 834 through a hose 836 into the drill pipe 818 and down to the drill bit 826. The drilling fluid can flow out from the drill bit 826 and be returned to the surface 804 through an annular area 840 between the drill pipe 818 and the sides of the borehole 812. The drilling fluid may then be returned to the mud pit 834, where such fluid is filtered. In some examples, the drilling fluid can be used to cool the drill bit 826, as well as to provide lubrication for the drill bit 826 during drilling operations. Additionally, the drilling fluid may be used to remove subsurface formation cuttings created by operating the drill bit 826.

A workstation 892 including a controller 896 may include modules comprising hardware circuitry, a processor, and/or memory circuits that may store software program modules and objects, and/or firmware, and combinations thereof that are configured to execute at least the methods of FIGS. 4-6. The workstation 892 may also include modulators and demodulators for modulating and demodulating data transmitted downhole through the cable 830 or telemetry received through the cable 830 from the downhole environment. The workstation 892 and controller 896 are shown near the rig 802 only for purposes of illustration as these components may be located at remote locations. The workstation 892 may include the surface portion of the resistivity imaging tool system.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of a non-transitory computer-readable storage medium can include, but not be limited to, read only memory (ROM), random access memory (RAM), a magnetic disk storage device, an optical storage device, a flash memory, and other electronic, magnetic, and/or optical memory devices.

Figure 9:
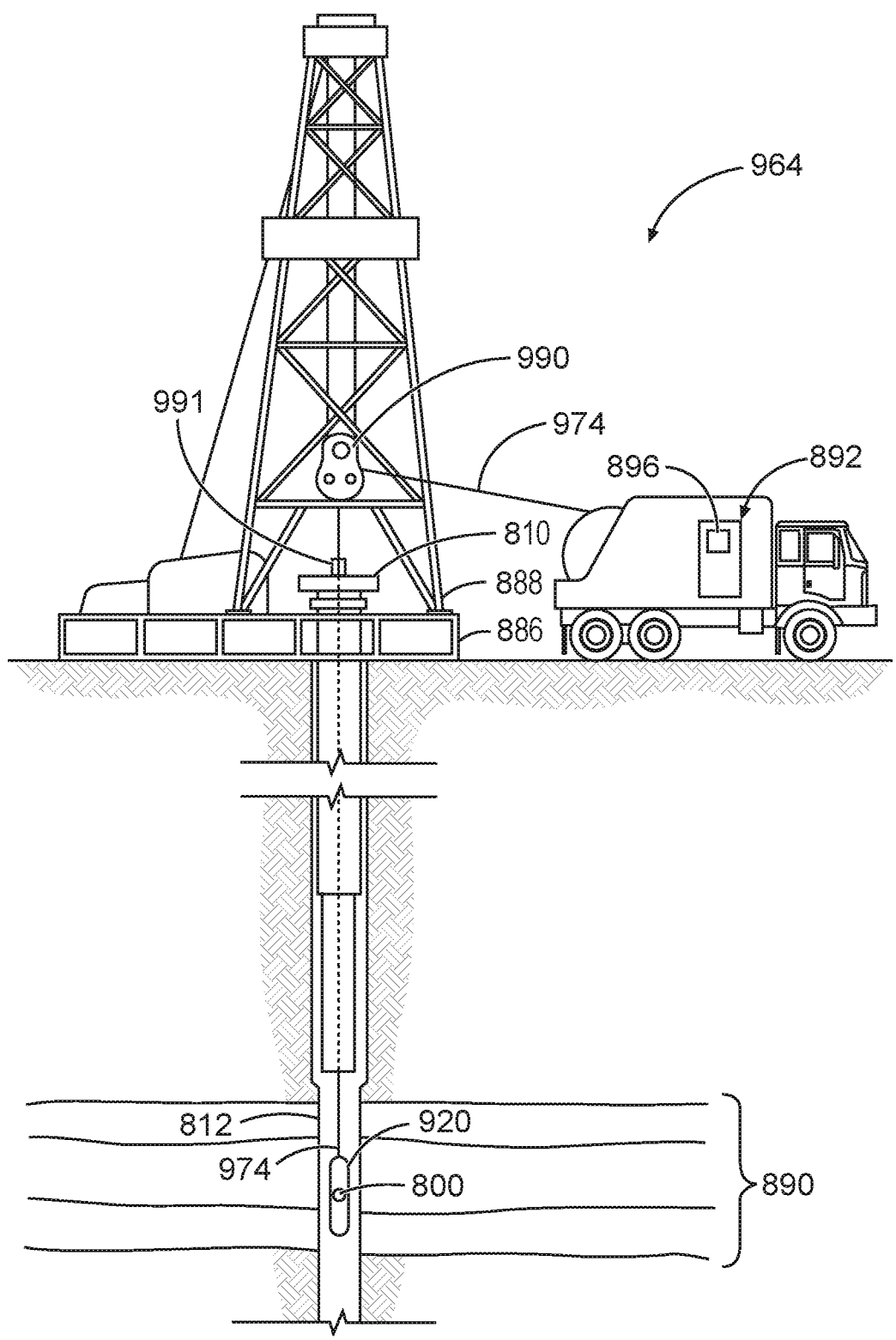
FIG. 9 is a diagram of a wireline system, according to aspects of the present disclosure.

FIG. 9 is a diagram showing a wireline system 964, according to various examples of the disclosure. The system 964 may comprise at least one wireline logging tool body 920, as part of a wireline logging operation in a borehole 812, including the resistivity imaging tool 800 described previously.

A drilling platform 886 equipped with a derrick 888 that supports a hoist 990 can be seen. Drilling oil and gas wells is commonly carried out using a string of drill pipes connected together so as to form a drill string that is lowered through a rotary table 810 into the borehole 812. Here it is assumed that the drillstring has been temporarily removed from the borehole 812 to allow the wireline logging tool body 920, such as a probe or sonde with the resistivity imaging tool 800, to be lowered by wireline or logging cable 974 (e.g., slickline cable) into the borehole 812. Typically, the wireline logging tool body 920 is lowered to the bottom of the region of interest and subsequently pulled upward at a substantially constant speed.

During the upward trip, at a series of depths, the tool with the resistivity imaging tool 800, as part of the imaging tool system, may be used to image the formation and perform formation parameter retrieval. The resulting imaging data may be communicated to a surface logging facility (e.g., workstation 892) for processing, analysis, and/or storage of the formation parameters. The workstation 892 may have a controller 896 that is able to execute any methods disclosed herein and to operate as part of the resistivity imaging tool system.

Figure 10:
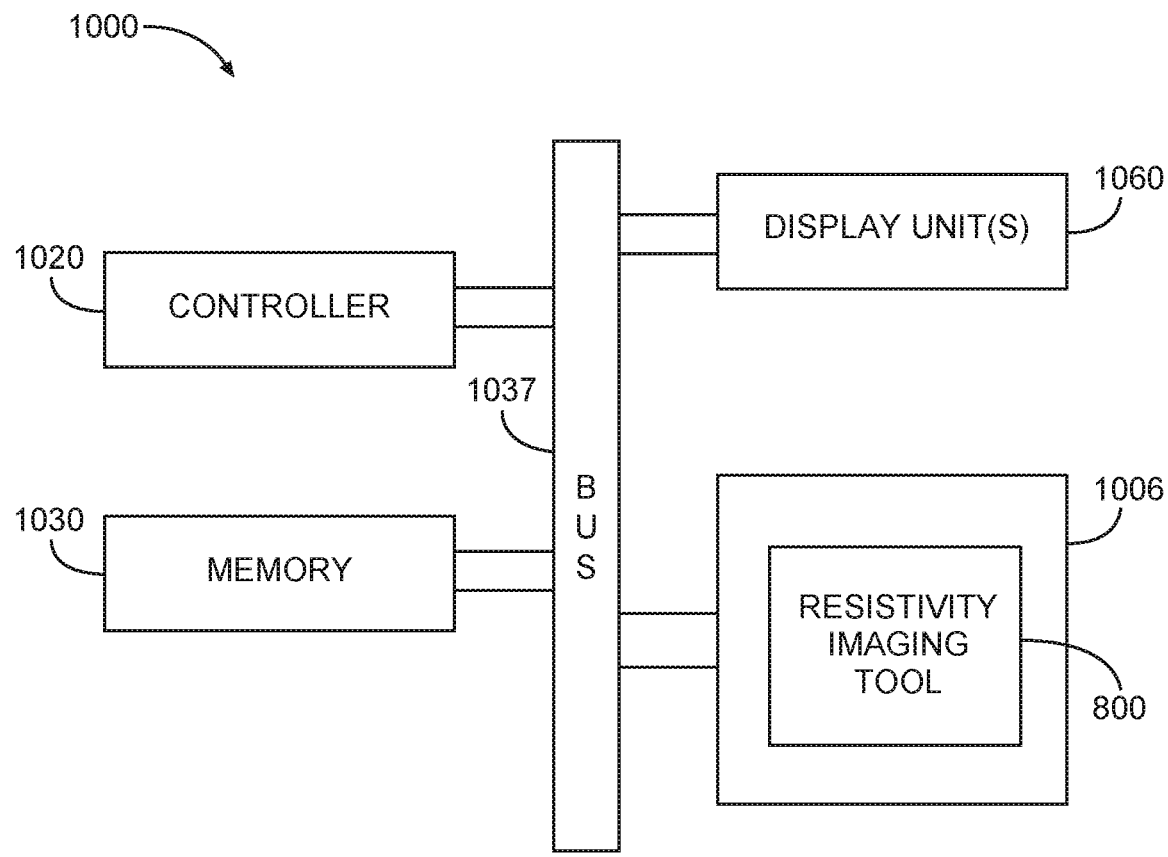
FIG. 10 is a block diagram of an example system operable to implement the activities of multiple methods, according to various aspects of the present disclosure.

FIG. 10 is a block diagram of an example system 1000 operable to implement the activities of multiple methods, according to various examples of the disclosure. The system 1000 may include a tool housing 1006 having the resistivity imaging tool 800 disposed therein. The system 1000 may be implemented as shown in FIGS. 8 and 9 with reference to the workstation 892 and controller 896.

The system 1000 may include a controller 1020, a memory 1030, and a communications unit 1035. The memory 1030 may be structured to include a database. The controller 1020, the memory 1030, and the communications unit 1035 may be arranged to operate as a processing unit to control operation of the resistivity imaging tool 800 and execute any methods disclosed herein in order to determine the formation parameters.

The communications unit 1035 may include communications capability for communicating from downhole to the surface or from the surface to downhole. Such communications capability can include a telemetry system such as mud pulse telemetry. In another example, the communications unit 1035 may use combinations of wired communication technologies and wireless technologies.

The system 1000 may also include a bus 1037 that provides electrical conductivity among the components of the system 1000. The bus 1037 can include an address bus, a data bus, and a control bus, each independently configured or in an integrated format. The bus 1037 may be realized using a number of different communication mediums that allows for the distribution of components of the system 1000. The bus 1037 may include a network. Use of the bus 1037 may be regulated by the controller 1020.

The system 1000 may include display unit(s) 1060 as a distributed component on the surface of a wellbore, which may be used with instructions stored in the memory 1030 to implement a user interface to monitor the operation of the tool 1006 or components distributed within the system 1000. The user interface may be used to input parameter values for thresholds such that the system 1000 can operate autonomously substantially without user intervention in a variety of applications. The user interface may also provide for manual override and change of control of the system 1000 to a user. Such a user interface may be operated in conjunction with the communications unit 1035 and the bus 1037.

These implementations can include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices.

Many embodiments may be realized. Several examples will now be described.

Example 1 is a method comprising: measuring a resistivity image, of a geological formation; comparing the measured resistivity image to a modelled resistivity image, where the modelled resistivity image is obtained from estimated formation parameters; calculating a cost function from the measured resistivity image and the modelled resistivity image; adjusting the estimated formation parameters to generate final formation parameters that represents a modelled resistivity image having a smallest cost function.

In Example 2, the subject matter of Example 1 optionally includes wherein the estimated formation parameters comprise formation layer resistivity, formation isotropy or anisotropy information, boundary layer depth, dip azimuth, and/or boundary layer dip angle.

In Example 3, the subject matter of any one or more of Examples 1-2 optionally include wherein the modelled resistivity image represents a formation comprising a plurality of formation layers.

In Example 4, the subject matter of any one or more of Examples 1-3 optionally include logging isotropic resistivity, anisotropic resistivity, and boundary layer dip angle of the geological formation in response to concatenating resistivity image measurements from a plurality of resistivity image measurements.

In Example 5, the subject matter of any one or more of Examples 1-4 optionally include wherein the cost function comprises a spatial correlation operation between the measured resistivity image and a plurality of the estimated formation parameters.

In Example 6, the subject matter of any one or more of Examples 1-5 optionally include wherein the cost function comprises a subtraction between the measured resistivity image and a plurality of the estimated formation parameters.

In Example 7, the subject matter of any one or more of Examples 5-6 optionally include wherein the modelled resistivity image comprises a borehole azimuthal coverage, a borehole depth coverage, and a number of image pixels based on the estimated formation parameters.

In Example 8, the subject matter of any one or more of Examples 1-7 optionally include wherein adjusting the estimated formation parameters comprises performing an inversion process based on the cost function.

In Example 9, the subject matter of any one or more of Examples 1-8 optionally include wherein adjusting the estimated formation parameters comprises performing a database search operation based on pre-computed modelled resistivity images.

In Example 10, the subject matter of any one or more of Examples 8-9 optionally include wherein the inversion process comprises: executing a plurality of iterations of comparisons between the modelled resistivity image and the measured resistivity image, wherein each iteration updates the estimated formation parameters of the modelled resistivity image; determining the final formation parameters in response to the error being less than a threshold.

Example 11 is an imaging tool system comprising: a button electrode structure; and a controller coupled to the button electrode structure for controlling operation of the imaging tool system, the controller configured to control measurement of a resistivity image of a geological formation by the button electrode structure, compare the measured resistivity image to a modelled resistivity image, where the modelled resistivity image is generated from estimated formation parameters, calculate a cost function from the measured resistivity image and the modelled resistivity image, and update the set of estimated formation parameters to generate a final set of formation parameters for the modelled resistivity image, the final set of formation parameters representing a modelled resistivity image having a smallest cost function.

In Example 12, the subject matter of Example 11 optionally includes wherein the geological formation comprises a plurality of layers and the controller is further configured to determine, in response to the final set of formation parameters, foundation layer resistivities of each of the plurality of layers, a boundary layer dip angle between adjacent ones of the plurality of layers, anisotropy information of each of the plurality of layers, and/or a transition length between adjacent layers.

In Example 13, the subject matter of any one or more of Examples 11-12 optionally include wherein the controller is further configured to perform one of an inversion process or a spatial correlation process between the measured resistivity image and the modelled resistivity image.

In Example 14, the subject matter of Example 13 optionally includes wherein the controller is further configured to perform the spatial correlation process by iteratively replacing the set of estimated formation parameters with each of the plurality of sets of formation parameters until a spatial correlation value between the modelled resistivity image and the measured resistivity image is a largest spatial correlation value relative to the spatial correlation values resulting from the others of the plurality of sets of formation parameters.

In Example 15, the subject matter of any one or more of Examples 13-14 optionally include wherein the controller is further configured to perform the inversion process by determining the cost function for each modelled resistivity image represented by a respective one of the plurality of sets of formation parameters, the controller further to determine which of the plurality of sets of formation parameters results in a modelled resistivity image having a lowest cost function value of each of the cost function values.

In Example 16, the subject matter of any one or more of Examples 13-15 optionally include wherein the controller is further configured to use one of a plurality of modelled resistivity images for a respective one of a plurality of measured resistivity images, each measured resistivity image measured at a different depth of a borehole in the geological formation.

In Example 17, the subject matter of any one or more of Examples 13-16 optionally include wherein the button electrode structure is disposed in a wireline tool or a drillstring tool.

Example 18 is a non-transitory computer readable medium that stores instructions for execution by processing circuitry to perform operations to determine formation parameters of a geological formation, the operations: measure a resistivity image of the geological formation; compare the measured resistivity image to a modelled resistivity image, where the modelled resistivity image is represented by estimated formation parameters; calculate a cost function from the measured resistivity image and the modelled resistivity image; and adjust the estimated formation parameters to generate final formation parameters that represents a modelled resistivity image having a smallest cost function.

In Example 19, the subject matter of Example 18 optionally includes wherein the operations further determine an inversion cost function for each modelled resistivity image, wherein the cost function comprises $\min|\tilde{I}-\overline{M}|^2$ where $\tilde{I}$ represents the measured resistivity image and $\overline{M}$ represents the modelled resistivity image represented by one of the plurality of sets of predetermined formation parameters.

In Example 20, the subject matter of Example 19 optionally includes wherein the inversion cost function comprises a regularization term for each depth of measurement.

In Example 21, the subject matter of any one or more of Examples 18-20 optionally include wherein the operations further incorporate anisotropy information, formation layer transition length, horizontal resistivity, vertical resistivity, anisotropy dip and azimuth angles, strike angle, and/or formation layer boundary dip angle in the modelled resistivity image.

This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   generating a modelled resistivity image based, at least in part, on an estimated dip angle corresponding to multiple layers of a geological formation;
   determining a smallest cost function of differences between a measured resistivity image of the geological formation and the modelled resistivity image based, at least in part, on iteratively comparing the measured resistivity image to the modelled resistivity image; and
   generating final formation parameters that represent the modelled resistivity image having the smallest cost function, wherein the final formation parameters comprise at least one of a first formation layer resistivity and a dip angle.

2. The method of claim 1, wherein generating a modelled resistivity image comprises generating the modelled resistivity image based on at least one of the first formation layer resistivity, formation isotropy or anisotropy information, boundary layer depth, dip azimuth, and one or more formation layer dip angle.

3. The method of claim 1, wherein generating a modelled resistivity image comprises generating the modelled resistivity image based on resistivities of the multiple layers and a plurality of dip angles.

4. The method of claim 1, wherein generating final formation parameters comprises logging isotropic resistivity, anisotropic resistivity, and dip angles of the multiple layers.

5. The method of claim 1, wherein determining the smallest cost function based on iteratively comparing the measured resistivity image and the modelled resistivity image comprises calculating a spatial correlation between the measured resistivity image and the modelled resistivity image for each iteration.

6. The method of claim 1, wherein determining the smallest cost function based on iteratively comparing the measured resistivity image and the modelled resistivity image comprises calculating a difference between the measured resistivity image and the modelled resistivity image for each iteration.

7. The method of claim 1, wherein generating a modelled resistivity image comprises generating a modelled resistivity image based on at least one of a borehole azimuthal coverage, a borehole depth coverage, and an image pixel size.

8. The method of claim 1, wherein determining the smallest cost function comprises performing an inversion process on the measured resistivity image and the modelled resistivity image, wherein performing the inversion process includes iteratively comparing the measured resistivity image and the modelled resistivity image.

9. The method of claim 1, wherein generating a modelled resistivity image comprises selecting a pre-computed modelled resistivity image from a database.

10. The method of claim 8,
    wherein each iteration of the inversion process comprises updating the modelled resistivity image based on reducing the cost function in a current iteration; and
    wherein generating the final formation parameters comprises generating the final formation parameters when a value of the cost function is less than a threshold.

11. An imaging tool system comprising:
    an electrode structure comprising a survey electrode, at least one button electrode, and a return electrode;
    a controller; and
    a machine-readable medium having program code executable by the controller to cause the system to,
       measure a resistivity image of a geological formation by the electrode structure;
       generate a modelled resistivity image based, at least in part, on a dip angle corresponding to multiple layers of the geological formation;
       determine a smallest cost function of differences between the measured resistivity image and the modelled resistivity image based, at least in part, on iteratively comparing the measured resistivity image to the modelled resistivity image, and
       generate final formation parameters based, at least in part, on the modelled resistivity image having the smallest cost function, wherein the final formation parameters comprise the dip angle.

12. The imaging tool system of claim 11, wherein the machine-readable medium program code executable by the controller to generate the modelled resistivity image comprises program code to:
    generate the modelled resistivity image also based on estimated formation parameters, wherein the estimated formation parameters comprise at least one of resistivities of each of the multiple layers, boundary layer dip angles between adjacent layers of the multiple layers, anisotropy information of multiple layers, and a transition length between the adjacent layers of the multiple layers, and wherein the final formation parameters comprise at least one of the estimated formation parameters.

13. The imaging tool system of claim 11, wherein the machine-readable medium program code executable by the controller to determine the smallest cost function comprises program code to:
    perform at least one of an inversion process or a spatial correlation process on the measured resistivity image and the modelled resistivity image, wherein the program code to perform the inversion process or the spatial correlation process includes program code to iteratively compare the measured resistivity image and the modelled resistivity image.

14. The imaging tool system of claim 13, wherein the machine-readable program code executable by the controller to perform the spatial correlation process comprises program code executable by the controller to:
    for each iteration, update the modelled resistivity image based on maximizing a spatial correlation value between the modelled resistivity image and the measured resistivity image; and generate the final formation parameters when a value of the cost function is less than a threshold, wherein the value of the cost function is based, at least in part, on the inverse of a value of the spatial correlation.

15. The imaging tool system of claim 13, wherein the machine-readable program code executable by the controller to perform the inversion process comprises program code executable by the controller to:

for each iteration,
update the modelled resistivity image based on reducing the cost function in a current iteration; and
generate the final formation parameters when the value of cost function is less than a threshold.

16. The imaging tool system of claim 1, wherein the machine-readable program code executable by the controller further comprises program code executable by the controller to:

concatenate a plurality of resistivity images measured at different depths of a borehole in the geological formation to generate the measured resistivity image.

17. The imaging tool system of claim 1, wherein the electrode structure is disposed in a wireline tool or a drillstring tool.

18. A non-transitory computer readable medium having stored therein program code for dip angle determination, the program code comprising instructions to:

generate a modelled resistivity image based, at least in part, on estimated formation parameters, wherein the estimated formation parameters include a dip angle corresponding to multiple layers of a geological formation;

calculate a cost function from a difference between a measured resistivity image of the geological formation and the modelled resistivity image;

iteratively adjust the estimated formation parameters to generate the modelled resistivity image corresponding to a smallest cost function; and output the estimated formation parameters corresponding to the smallest cost function as final formation parameters.

19. The non-transitory computer readable medium of claim 18, wherein program code comprising instructions to calculate a cost function comprises program code to:

determine an inversion cost function for the modelled resistivity image of a current iteration, wherein the inversion cost function comprises $\min|\bar{I}-\bar{M}|^2$ where $\bar{I}$ represents the measured resistivity image and $\bar{M}$ represents the modelled resistivity image.

20. The non-transitory computer readable medium of claim 19, wherein program code comprising instructions to determine the inversion cost function further comprises program code to:

regularize or smooth variations of the inversion cost function.

21. The non-transitory computer readable medium of claim 18, wherein the estimated formation parameters further comprise at least one of anisotropy information, formation layer transition length, horizontal resistivity, vertical resistivity, anisotropy dip angles, anisotropy azimuth angles, strike angle, and formation layer boundary dip angle.

* * * * *

UNITED STATES PATENT AND TRADEMARK OFFICE
CERTIFICATE OF CORRECTION

PATENT NO. : 10,782,438 B2  
APPLICATION NO. : 16/088601  
DATED : September 22, 2020  
INVENTOR(S) : Baris Guner and Burkay Donderici Page 1 of 1

It is certified that error appears in the above-identified patent and that said Letters Patent is hereby corrected as shown below:

In the Claims

Column 13, Line 19, the portion reading "claim 1" should read --claim 11--

Column 13, Line 26, the portion reading "claim 1" should read --claim 11--

Signed and Sealed this  
Seventeenth Day of November, 2020

Andrei Iancu  
*Director of the United States Patent and Trademark Office*